United States Patent [19]

Freedman

[11] 4,278,941

[45] Jul. 14, 1981

[54] HIGH FREQUENCY INDUCTION LOG FOR DETERMINING RESISTIVITY AND DIELECTRIC CONSTANT OF THE EARTH

[75] Inventor: Robert Freedman, Houston, Tex.

[73] Assignee: Shell Oil Company, Houston, Tex.

[21] Appl. No.: 955,673

[22] Filed: Oct. 30, 1978

[51] Int. Cl.³ .............................................. G01V 3/28
[52] U.S. Cl. .................................. 324/341; 324/339
[58] Field of Search ........................ 324/338, 339, 341

[56] References Cited

U.S. PATENT DOCUMENTS

| 2,788,483 | 4/1957 | Doll ....................................... 324/339 |
| 3,551,797 | 12/1970 | Gouilloud et al. .................... 324/338 |
| 3,706,025 | 12/1972 | Regat .................................... 324/339 |
| 4,012,689 | 3/1977 | Cox et al. ............................. 324/341 |
| 4,107,597 | 8/1978 | Meador et al. .................. 324/339 X |
| 4,107,598 | 8/1978 | Meador et al. ....................... 324/341 |

FOREIGN PATENT DOCUMENTS

| 192303 | 4/1967 | U.S.S.R. ................................. 324/341 |
| 272450 | 9/1970 | U.S.S.R. ................................. 324/341 |

*Primary Examiner*—Gerard R. Strecker

[57] ABSTRACT

A method and apparatus for logging rock formations penetrated by a borehole to determine both the resistivity and dielectric constant of the formations. The apparatus comprises an induction logging tool having at least a transmitting coil and two receiver coils and operating in the radio frequency range from 20 to 60 megahertz. The method utilizes both the in-phase and out-of-phase, with respect to the transmitter current, voltage components which are measured at each receiver. The in-phase and out-of-phase voltage components are used to compute the phase shift between the voltage signals and the relative attenuation of the voltage amplitudes between the receivers. The phase shifts and relative attenuations are relatively insensitive to the borehole (e.g., borehole radius and drilling mud resistivity) and can be used as inputs into theoretically constructed nomograms to determine both the resistivity and dielectric constant of the formation. If the invasion of the drilling mud into the formation is not negligible then a tool with four spatially separated receiver coils is employed and the phase shifts and relative attenuations between the three adjacent pairs of receiver coils are computed from the in-phase and out-of-phase voltage components measured at each receiver. These data are used to determine the resistivity and dielectric constant of the invaded zone, the radius of the invaded zone, and the resistivity and dielectric constant of the non-invaded formation.

6 Claims, 5 Drawing Figures

HIGH FREQUENCY INDUCTION LOG FOR DETERMINING RESISTIVITY AND DIELECTRIC CONSTANT OF THE EARTH

BACKGROUND OF THE INVENTION

The present invention relates to the logging of boreholes to determine the fluid contents of rock formations penetrated by a borehole. In particular, the invention relates to electric or resistivity logging devices used to determine the resistivities of porous rock formations in order to distinguish water bearing zones from hydrocarbon bearing zones. In the case of high resistivity formations containing low salinity of fresh water there may not exist sufficient contrast in the fluid resistivities to permit evaluation of the zones of interest on the basis of resistivity measurements. This problem has led to the use of induction logging devices in an attempt to measure the dielectric constants of the rock formations surrounding the borehole. The dielectric constant of water is large compared to that of hydrocarbons and therefore one can distinguish a fresh water bearing zone from a hydrocarbon bearing zone from a knowledge of the dielectric constant of the zone. Presently used or conventional induction logging devices operate at a frequency of 20 kHz. These devices determine an apparent resistivity of the formation surrounding the borehole by utilizing the component of the voltage induced in a measuring coil which oscillates in-phase with respect to the alternating current in the transmitter coil. Conventional induction logging devices have the same problems as all conventional electrical logging devices in distinguishing between two highly resistive zones, one of which contains fresh water and the other which contains hydrocarbons. A useful reference to the theory underlying the operation of conventional induction logging devices is the publication by J. H. Moran and K. S. Kunz entitled "Basic Theory of Induction Logging and Application to Study of Two-Coil Sondes" which is published in *Geophysics*, vol. 27, No. 6, pp. 829–858, 1962.

In an attempt to overcome the above problems experienced by conventional resistivity logging devices, U.S. Pat. No. 4,012,689 suggests the use of radio frequencies in the range of 20 to 40 MHz and proposes a method for determining both the dielectric constant and resistivity of the formation surrounding the borehole. The use of higher frequencies is necessary in order to obtain a tool response which is sensitive to the dielectric constant of the formation. This can be understood in more detail by comparing the relative magnitudes of the conduction current and the displacement current (the dielectric constant enters the equations through this term) terms in Maxwell's equations. For the dielectric constants and resistivities encountered in well logging these two terms become of comparable magnitude in the frequency range proposed in the above referenced patent. At the lower frequencies at which conventional induction logging devices operate, the displacement current term is negligible compared to the conduction current term and therefore the response of these devices is insensitive to the dielectric constant. The above referenced patent defines the response of the proposed device in terms of the phase shift between the signals received at two spatially separated receiver coils and the signal amplitude at one of the receiver coils with respect to the amplitude of the same signal in air. This patent provides a theoretically calculated nomogram (e.g., see FIG. 6 of the patent) for the case of a logging sonde in an infinite homogeneous medium penetrated by a borehole. For this logging geometry and for the specific borehole properties (e.g., drilling mud resistivity and borehole radius) for which this nomogram is valid one can use the measured phase shift and signal amplitude as known quantities and thereby determine, from the nomogram, values of the resistivity and dielectric constant of the formation surrounding the borehole.

The method proposed in the above referenced patent for determining the formation resistivity and dielectric constant has some serious problems. These problems can be traced to the fact that the signal amplitude (relative to its value in air) at a receiver coil is extremely sensitive to the properties of the borehole. To illustrate the implications of this, we consider the nomogram (FIG. 6) in the above referenced patent. This nomogram is valid for a fresh water mud having resistivity of 1 ohm-m. If a salt water mud having a resistivity of 0.0667 ohm-m is used instead then the values of the amplitudes shown on the nomogram are in error by a factor of roughly 100. The amplitude is also very sensitive to the borehole radius whenever the drilling mud is very conductive. For example, if the borehole is filled with a drilling mud having resistivity 0.0667 ohm-m and the borehole radius is increased from 0.1 m to 0.127 m then the signal amplitudes at a receiver coil decrease by roughly a factor of 10. Thus small variations in mud resistivity and borehole size from those assumed in preparing the nomogram can make the results meaningless. In addition to the above problems the patent makes no reference to the problem created by the invasion of the drilling mud into the formation surrounding the borehole. The mud invasion can have a serious effect on the accuracy of the results obtained using the proposed method since the invaded zone has a different dielectric constant and resistivity than the non-invaded formation.

SUMMARY OF THE INVENTION

The present invention solves the problems of the system described in the above referenced patent. A response which is essentially independent of the properties of the borehole is obtained by utilizing the relative attenuation of the signal amplitudes at two adjacent receiver coils. The relative attenuation is proportional to the logarithm of the ratio of the voltages of the signals measured at the two receiver coils. The use of the logarithm of the ratio of the signals produces a response which is essentially independent of the properties of the borehole (e.g., the borehole radius and the drilling mud resistivity). In addition to the relative attenuation the present invention utilizes the phase shift in the signals measured at the two adjacent receiver coils.

The present invention also solves the problem of drilling mud invasion of the formation by utilzing a logging sonde having four receiver coils. The use of four receiver coils permits one to measure the phase shifts and relative attenuations between three separate pairs of adjacent receiver coils. These six measured responses can be used to determine the five unknown parameters which characterize the invaded formation. These five unknown parameters are the resistivity and dielectric constant of both the invaded zone and the non-invaded zone of the formation, and the radius of the invaded zone. A solution of the invasion problem thus involves the determination of the five unknown parameters from the measured responses of an high frequency induction logging (HFIL) tool. This problem is an example of an "inverse problem" of the kind commonly encountered in the interpretation of well logging and geophysical data. This problem can be described as follows: Suppose one is given at least five independent measurements of the response of an HFIL device (as determined, for example, by a four-receiver HFIL tool). Suppose further that one has solved Maxwell's equations for the response of a model four-receiver HFIL device situated in a formation which is invaded by the drilling fluid. Thus one can calculate the theoretical responses of the model HFIL device for any given set of the five unknown parameters. There exists well-known numerical methods such as Newton's Method whereby one can determine values of the five unknown parameters such that the calculated theoretical responses are, to within a specified precision, identical to the measured (input) responses. If the set of parameters thereby determined is unique, then one has solved the inverse problem. A textbook which discusses Newton's Method and other related methods of non-linear simultaneous displacements is *Applied Numerical Methods* written by B. Carnahan, H. A. Luther and J. O. Wilkes which was published in 1969 by John Wiley and Sons, Inc. If the invasion can be neglected then there are only two unknown parameters to be determined (e.g., the dielectric constant and resistivity of the formation) from the response of the tool. These can be obtained from a nomogram like the one shown in the drawings that represents a graphical solution to the inverse problem for the case of no invasion.

The apparatus used in the present invention may comprise a conventional induction logging tool having at least two and preferably four receiver coils. The transmitter coil should be energized by an alternating current chosen from the frequency range of 20 to 60 MHz. The tool should have the capability to measure and record both the in-phase and out-of-phase, with respect to the transmitter current, voltage components induced in each receiver coil. The in-phase and out-of-phase components are preferably recorded in a digital form so that they can be utilized to calculate the phase shifts between signals received at adjacent receiver coils and also the relative attenuations of the signal amplitudes between the same receiver coils. These phase shifts and attenuations are preferably recorded on a log as functions of wireline depth. If the invasion is negligible then one can easily determine both the dielectric constant and the resistivity of the formation by using the phase shift and relative attenuation, which are read off the log, as inputs into a nomogram. If the invasion is not negligible then one must use at least five of the six phase shifts and relative attentuations which are recorded by a four-receiver HFIL tool. These responses can be input into a computer which is programmed to solve the inverse problem discussed above and therefore to determine the five unknown parameters characterizing the invaded formation.

BRIEF DESCRIPTION OF THE DRAWINGS

The present invention will be more easily understood from the following detailed description of a preferred embodiment when taken in conjunction with the attached drawings in which:

FIG. 4 is a schematic illustration depicting a model two-receiver HFIL device near a plane interface separating a fresh water zone from a hydrocarbon zone.

PREFERRED EMBODIMENT

Figure 1:
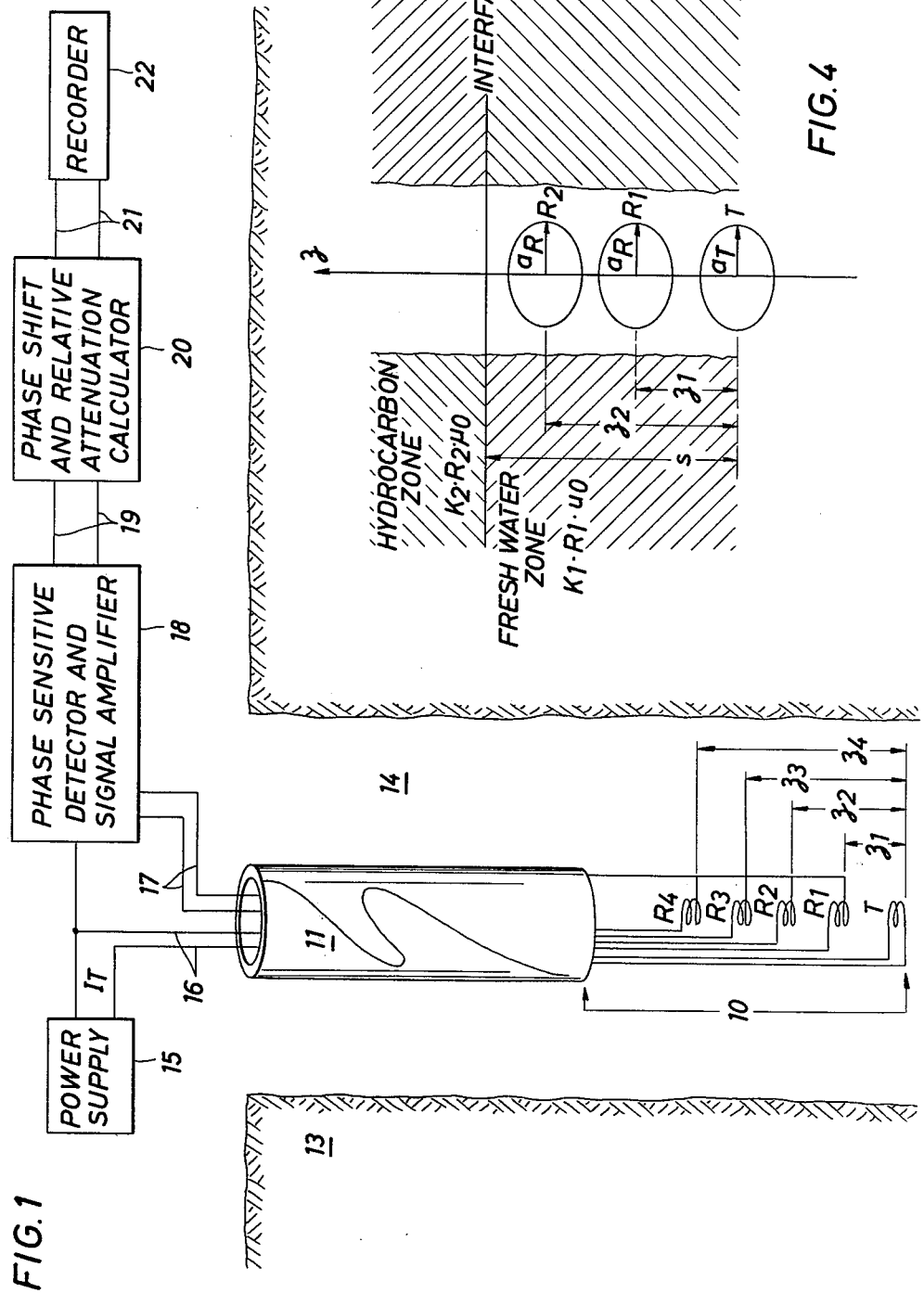
FIG. 1 is a schematic diagram illustrative of a four-receiver HFIL apparatus constructed in accordance with the present invention.

In order to understand the invention, it is necessary to define the phase shifts and relative attenuations which are to be recorded on the log in terms of the physical quantities which are measured by the tool. These quantities are both the in-phase ($V_I$) and out-of-phase ($V_Q$), with respect to the transmitter current, voltage components which are induced in each receiver coil. These voltage components can be measured by using a phase sensitive detection system such as those commonly employed in conventional induction logging tools. A description of this prior art is given in U.S. Pat. No. 2,788,483. The phase shift and relative attenuation are then computed from the four measured voltage components determined for each pair of adjacent receivers. For example, consider a pair of adjacent receivers $R_1$ and $R_2$ located at $z_1$ and $z_2$ such that $z_2 > z_1$. The measured quantities are then the four voltage components $V_{I,1}$, $V_{Q,1}$, $V_{I,2}$ and $V_{Q,2}$. To proceed it is convenient to introduce the complex ratio $$R = R' + iR'' = \frac{V_{I,2} + iV_{Q,2}}{V_{I,1} + iV_{Q,1}} \quad (1)$$

where $$R' = \frac{V_{I,1} V_{I,2} + V_{Q,1} V_{Q,2}}{V^2_{I,1} + V^2_{Q,1}} \quad (2)$$

and $$R'' = \frac{V_{I,1} V_{Q,2} - V_{Q,1} V_{I,2}}{V^2_{I,1} + V^2_{Q,1}} \quad (3)$$

It is not difficult to demonstrate that the phase of the complex ratio R is simply the phase shift $\Delta\phi$ of the signals received at the two adjacent receiver coils. This phase shift is therefore given by (in radians)

$$\Delta\phi = \tan^{-1}(R''/R') + F \quad (4)$$

where R' and R'' are defined above the function F is defined by the equation $$F = \pi/2[(1 - \text{sgn } R') + (1 - \text{sgn } R'')(1 + \text{sgn } R')] \quad (5)$$

with the sgn function defined by $$\text{sgn } x = \begin{cases} \frac{x}{|x|} & \text{for } x \neq 0 \\ & \text{for } x = 0 \end{cases} \quad (6)$$

In equation (4) the inverse tangent is to be understood as a principle value and is therefore defined in the range from $-\pi/2$ to $\pi/2$. The function F has been introduced into equation (4) to take proper account of the algebraic signs of the voltage components which results in equation (4) producing continuous phase shifts in the range $0 \leq \Delta\phi \leq 2\pi$. We have thus far shown that the phase shift between two adjacent receivers can be expressed in terms of the measured voltage components by using equations (2)-(6). In addition to the phase shift one also needs the relative attenuation to characterize the response of the tool. To arrive at an expression for the relative attenuation we first note that the amplitude of the voltage induced in the l-th receiver is given by the equation $$V_{l,o} = \sqrt{V^2_{I,1} + V^2_{Q,1}} \quad (7)$$

The relative attenuation A is obtained from the logarithm of the ratio of the induced voltage amplitudes at the two adjacent receivers and is given by (in decibels per meter)

$$A = (8.686/L) \ln (V_{1,o}/V_{2,o}) \quad (8)$$

where $L = z_2 - z_1$ is the distance in meters separating the centers of the two receivers.

In the above discussion it was sufficient to consider a single pair of adjacent receivers. It should be understood however, that in the presence of invasion one must use a four-receiver HFIL tool. There are then three pairs of adjacent receivers and therefore three phase shifts and three relative attenuations which are recorded by the tool. As discussed previously, one must use at least five of these six quantities in order to determine the five unknown parameters which characterize the invasion. Also, as we have previously noted, the relative attenuation as defined by equation (8) is relatively insensitive to the properties of the borehole (e.g., the borehole radius and the resistivity of the drilling mud). To illustrate this point further consider a HFIL tool, having tool parameters identical to those shown in FIG. 2, and situated in a ten inch borehole ($a = 0.127$ m). If the drilling mud is changed from a fresh water mud having resistivity $R_m = 1$ ohm-m to a salt water mud with $R_m = 0.0667$ ohm-m then the values of A change by roughly five percent. This is to be contrasted with the tool proposed in U.S. Pat. No. 4,012,689 where for the same conditions the response (e.g., the amplitude at a receiver coil relative to its value in air) changes by a factor of several hundred. The response defined in equation (8) is also essentially independent of the borehole size even if conductive drilling mud is in the borehole. For example, consider an HFIL tool having tool parameters identical to those shown in FIG. 2. Let the tool be situated in a borehole filled with a conductive drilling mud having resistivity $R_m = 0.0667$ ohm-m. If the borehole radius is changed from 0.1 m to 0.127 m then the values of A given by equation (8) change by less than five percent. This is to be contrasted with the tool proposed in U.S. Pat. No. 4,012,689 where for the same conditions in response changes by roughly a factor of one hundred.

In FIG. 1 a coil system 10 is shown suspended by an armored cable 11 in a borehole 14 which penetrates an earth rock formation 13. The coil system 10 may be raised and lowered in the borehole 14 by means of a winch (not shown) on which the cable 11 is wound. The coil system 10 is comprised of a transmitter coil T and four receiver coils $R_1$, $R_2$, $R_3$ and $R_4$ whose centers are separated from the center of the transmitter T by distances $z_1$, $z_2$, $z_3$ and $z_4$, respectively. As noted above, only two receiver coils are necessary in order to obtain the desired information in situations where the invasion of the drilling mud (not shown) into the formation 13 is negligible. The transmitter coil T is energized by a power supply 15 located on the surface of the earth. The power supply 15 generates an alternating current $I_T$ chosen from the frequency range of 20 to 60 MHz. This alternating current is fed into the transmitter T by means of an insulated conducting cable 16 which is part of the armored cable 11 which is used to raise and lower the coil system 10. The receiver coils $R_1$, $R_2$, $R_3$ and $R_4$ are connected by an insulated conducting cable 17, which forms part of the armored cable 11, to a phase sensitive detector and amplifier 18. The phase sensitive detector and amplifier 18 are connected by means of the insulated conducting cable 16 to the power supply 15. This permits the transmitter current $I_T$ to be used as a phase reference for the voltage signals received from the receiver coils. These signals are amplified and both their in-phase and out-of-phase, with respect to the transmitter current, voltage components are determined. The phase sensitive detector and amplifier network 18 can be constructed according to the teachings of U.S. Pat. No. 2,788,483. The outputs of this network 18 are the eight voltage components from the four receiver coils. These voltage components are input into a calculator 20 which is connected to the phase sensitive detector and amplifier 18 by means of insulated conducting cables 19. The calculator 20 is a minicomputer which computes, using the eight measured voltage components, values of phase shifts and relative attenuations between adjacent receiver coils by using relationships described earlier. Leads 21 are connected to a conventional recording system driven by a measuring wheel (not shown) which is mechanically coupled to cable 11 through an appropriate linkage (not shown). As a result the phase shifts and attenuations are obtained on a log as functions of wireline depth. As described earlier these data can be used to obtain the radius of the invaded zone, the resistivity and the dielectric constant of the invaded zone and the resistivity and dielectric constant of the non-invaded zone.

The actual transmitter-receiver spacings $z_1$, $z_2$, $z_3$ and $z_4$ which are to be employed represent a compromise. For a four-receiver HFIL tool approximate spacings $z_1 = 0.3$ m, $z_2 = 0.6$ m, $z_3 = 0.85$ m and $z_4 = 1.15$ m are appropriate. In general increased spacings provide an increase in the depth of investigation of the tool, but reduce the amplitude of the resulting received signals. The choice of the transmitter frequency (to be chosen from the range 20 to 60 MHz) also represents a compromise since lower frequencies provide increased receiver signal amplitudes but are less sensitive to changes in the dielectric constant of the formation. The radii of the transmitter and receiver coils and the number of turns of wire comprising them are to be determined by signal-to-noise ratio considerations. The larger the radii and the greater the number of turns the larger the signal-to-noise ratio which can be obtained.

Figure 2:
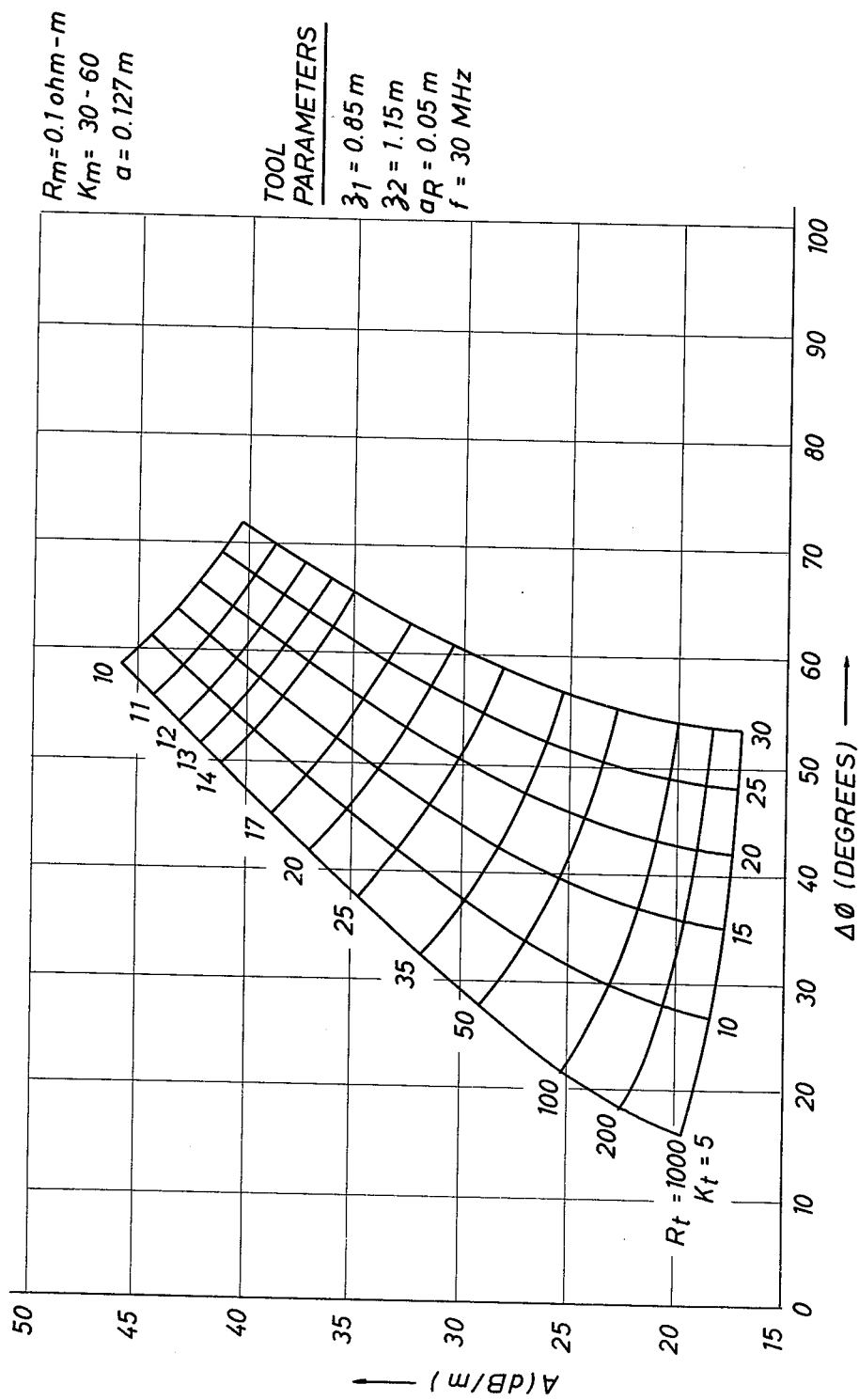
FIG. 2 is a nomogram constructed from the theoretical response of a model two-receiver HFIL tool situated in a borehole which penetrates a thick non-invaded bed.

The nomogram in FIG. 2 permits one to determine the resistivity ($R_t$) and relative dielectric constant ($K_t$) of a non-invaded formation by using the relative attenuation A (in decibels per meter) and the phase shift $\Delta\phi$ (in degrees) which are recorded by the tool. This nomogram is valid for the values of the borehole radius (a), drilling mud resistivity ($R_m$) and relative dielectric constant ($K_m$), transmitter-receiver spacings $z_1$ and $z_2$, transmitter frequency f and receiver coil radii ($a_R$) shown on the Figure.

The nomogram of FIG. 2 may be constructed in the following manner. After assuming a particular logging geometry, Maxwell's equations are solved for the in-phase and out-of-phase voltage components at each receiver coil. From equations (1)–(8) above, one can determine the phase shift and relative attenuation between any pair of adjacent receiver coils. This can be repeated for different values of the formation dielectric constant $K_t$ and resistivity $R_t$ to provide sufficient data to construct the nomogram shown in FIG. 2. Additional nomograms can be prepared having different logging geometries. For a complete discussion of analysis of Maxwell's equation one should refer to the Moran and Kunz article referenced above.

Figure 3:
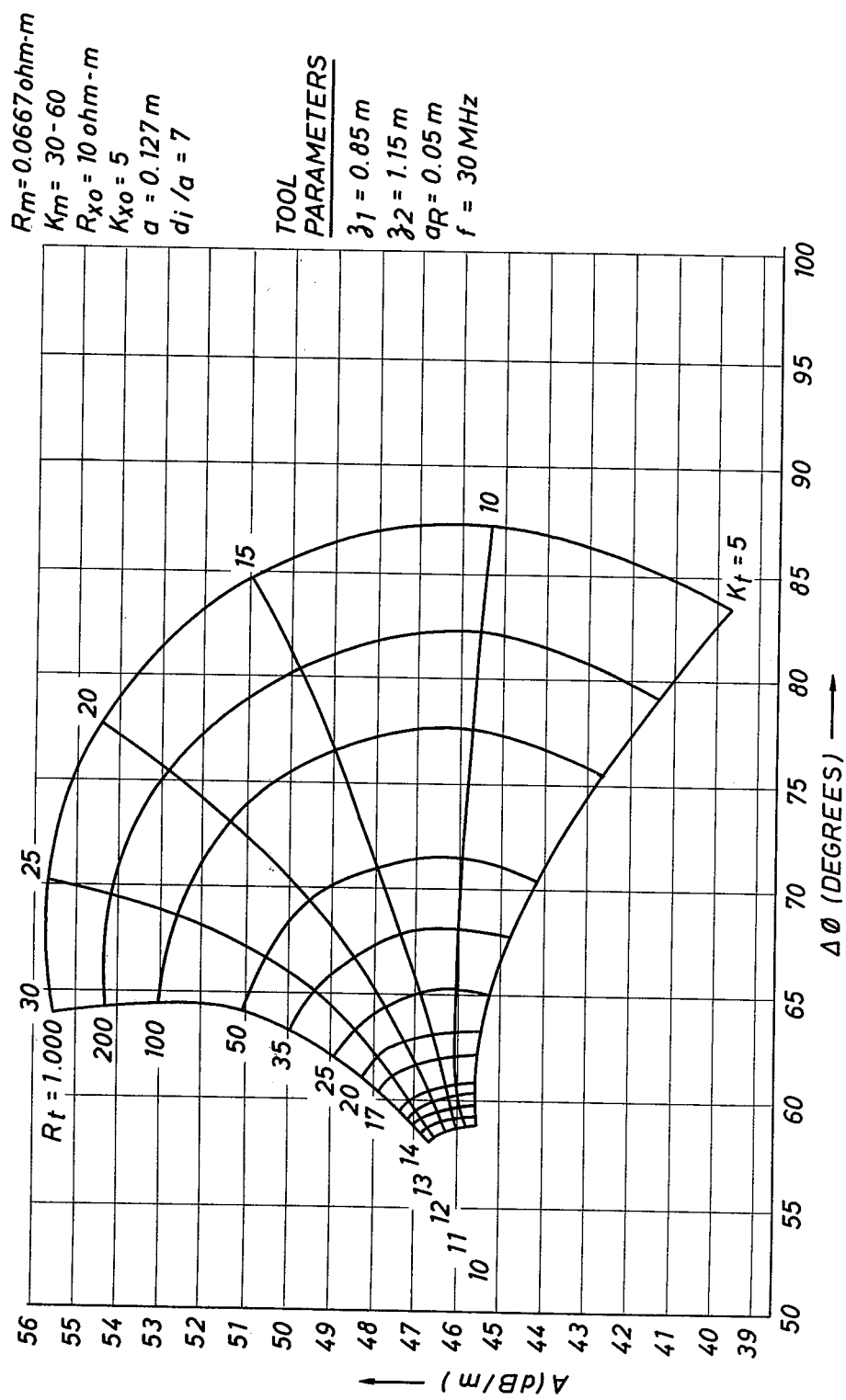
FIG. 3 is a nomogram constructed from the theoretical response of a model two-receiver HFIL device situated in a borehole which penetrates a thick invaded bed.

The nomogram in FIG. 3 permits one to determine the resistivity $R_t$ and the relative dielectric constant $K_t$ of the invaded zone of the formation from the phase shift and the relative attenuation A measured by the tool. The radius of the invaded zone is denoted by $d_i$ and the dimensionless ratio $d_i/a$ characterizes the depth of invasion. This nomogram is valid for the values of the invaded zone resistivity $R_{xo}$, relative dielectric constant $K_{xo}$ and dimensionless ratio $d_i/a$ shown on the Figure. On comparison of FIGS. 2 and 3 we observe that the relationship between $R_t$ and $K_t$ and the tool responses $\Delta\phi$ and A is significantly affected by the invasion. Thus, it is crucial for obtaining meaningful results to take proper account of the effects of invasion. As we discussed earlier it is not feasible, in general, to prepare nomograms for an invaded formation since there are five unknown parameters (e.g., $d_i$, $K_{xo}$, $R_{xo}$, $K_t$ and $R_t$) which characterize the invaded formation. One must then use the numerical methods, described earlier, to obtain these five unknown parameters from the recorded tool responses.

Figure 5:
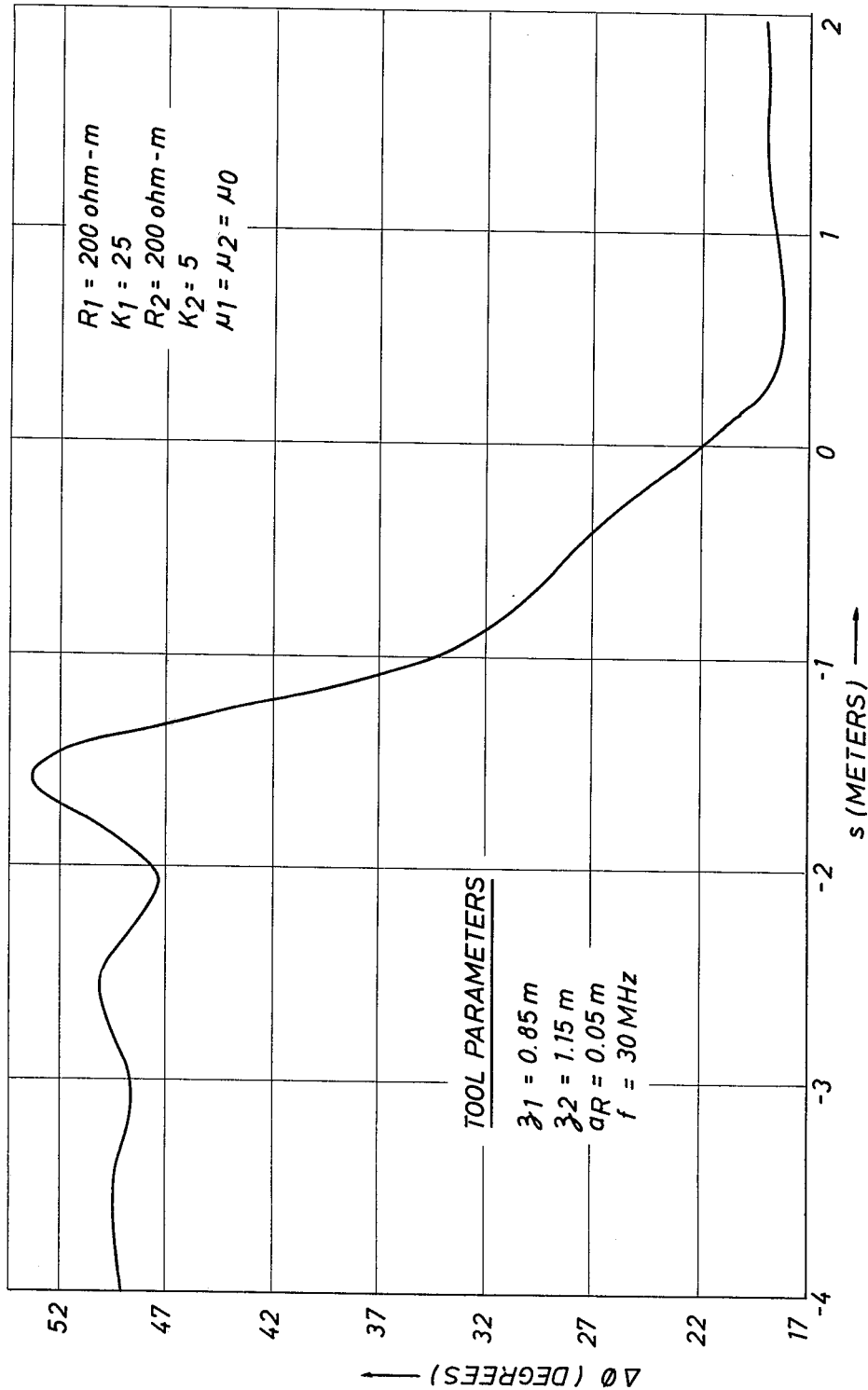
FIG. 5 illustrates how the phase shift of the device shown in FIG. 4 depends on the distance of the transmitter from the interface for two zones having identical resistivities.

FIG. 4 is a schematic drawing of a transmitter two receiver HFIL tool near an interface separating a fresh water bearing zone and a hydrocarbon bearing zone. The two zones have identical resistivities and the parameter s in meters denotes the distance of the transmitter from the interface. The two zones are distinguishable on the basis of their fluid contents because of the difference in their dielectric constants. For example, if one assumes the fresh water has a dielectric constant of $K_1=25$ and the hydrocarbon a dielectric constant of $K_2=5$, the phase shift between receiver coils will have values shown in FIG. 5 as the tool moves past the interface. The negative values of s indicate the transmitter is below the interface and positive values indicate it is above the interface. From FIG. 5 one can accurately determine the location of the interface.

What is claimed is:

1. A method of induction logging a borehole to obtain the resistivity and dielectric constant of formations surrounding the borehole, said method comprising:
    producing an alternating electric current in a transmitter coil at a first location in the borehole, said electric current having a frequency of between 20 and 60 megahertz;
    measuring at second and third locations both the voltage signals $V_{I,1}$ and $V_{I,2}$ that are in-phase with respect to said current and the voltage signals $V_{Q,1}$ and $V_{Q,2}$ which are out-of-phase with respect to said current, said second and third locations being spaced different distances from said first location;
    determining the phase shift $\Delta\phi$ between the voltage signals at the second and third locations by solving $$\Delta\Phi = \tan^{-1}\frac{R''}{R'} + F$$

wherein $$R' = \frac{V_{I,1} V_{I,2} + V_{Q,1} V_{Q,2}}{V^2_{I,1} + V^2_{Q,1}};$$

$$R'' = \frac{-I.1 V_{Q,2} + V_{Q,1} V_{I,2}}{V^2_{I,1} + V^2_{Q,1}};$$

$$F = \frac{\pi}{2} [(1 - \text{sgn } R') + (1 - \text{sgn } R'') (1 + \text{sgn } R')]$$

and $$\text{sgn } x = \frac{x}{|x|} \text{ for } x \neq 0 \text{ and } 1 \text{ for } x = 0$$

determining the relative attenuation between the voltage amplitudes at the second and third locations by taking the logarithm of the voltages at the second and third locations, where the voltage amplitudes are the square roots of the sums of the squares of the in-phase and out-of-phase voltage components at each receiver; and, utilizing said phase shifts and relative attenuations to derive the dielectric constant and resistivity of the formations from a previously prepared nomogram.

2. The method of claim 1 wherein the in-phase and out-of-phase voltages are measured at a fourth location spaced from said second and third locations.

3. The method of claim 2 wherein said additional in-phase and out-of-phase voltages are used to compensate for the invaded zone.

4. The method of claim 1 wherein the voltage amplitudes are obtained from the square root of the sum of the squares of the in-phase and out-of-phase voltage components.

5. An apparatus for induction logging a borehole to obtain the resistivity and dielectric constant of the formation surrounding the borehole, said apparatus comprising:
    a logging tool adapted for lowering into the borehole and having three spaced coils disposed thereon; one coil being a transmitter coil and the remaining two coils being receiver coils;
    a power source having a frequency between 20 and 60 megahertz, said power source being coupled to said transmitter coil;
    a phase sensitive detector and amplifier network coupled to the said two receiver coils, said phase sensitive detector and amplifier network measuring at both receiver coils the voltage that is in-phase with respect to the power source and the voltage that is out-of-phase with respect to the power source;
    computer means disposed to utilize the in-phase and out-of-phase signals to compute the phase shift in the voltages between the receiver coils and the relative attenuation of the voltage amplitudes;
    a recording mechanism to record as a function of wireline depth the phase shift and relative attenuation computed by the said circuit means; and,
    a nomogram for obtaining the resistivity and relative dielectric constant of the formation from the phase shift and relative attenuation.

6. The apparatus of claim 5 and, in addition, two additional receiver coils, with said additional receiver coils being coupled to said phase sensitive detector and amplifier network, to said circuit means and also to said recording mechanism to measure, compute, and record additional phase shifts and relative attenuations between all adjacent pairs of receiver coils; and additional computing means for utilizing the said recorded phase shifts and relative attenuations to determine the resistivity and dielectric constant of the invaded zone of the formation, the radius of the invaded zone, and the resistivity and dielectric constant of the non-invaded zone of the formation.

* * * * *